United States Patent
Salter et al.

(10) Patent No.: US 9,573,520 B1
(45) Date of Patent: Feb. 21, 2017

(54) LUMINESCENT CONSOLE STORAGE BIN

(71) Applicant: Ford Global Technologies, LLC, Dearborn, MI (US)

(72) Inventors: Stuart C. Salter, White Lake, MI (US); Pietro Buttolo, Dearborn Heights, MI (US); James J. Surman, Clinton Township, MI (US); Alex Lince, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/232,082

(22) Filed: Aug. 9, 2016

(51) Int. Cl.
| | |
|---|---|
| *B60Q 1/00* | (2006.01) |
| *B60Q 1/26* | (2006.01) |
| *B60Q 3/06* | (2006.01) |
| *B60Q 3/00* | (2006.01) |
| *B60Q 3/02* | (2006.01) |
| *F21V 9/16* | (2006.01) |
| *H05B 37/02* | (2006.01) |

(52) U.S. Cl.
CPC .............. *B60Q 3/06* (2013.01); *B60Q 3/002* (2013.01); *B60Q 3/0213* (2013.01); *F21V 9/16* (2013.01); *H05B 37/0218* (2013.01)

(58) Field of Classification Search
CPC ......... B60Q 3/002; B60Q 3/004; B60Q 3/005; B60Q 3/0209; B60Q 3/0213; B60Q 3/00226; B60Q 3/023; B60Q 3/06; F21V 9/16; H05B 37/0218
USPC ......... 362/478–488, 492, 503–504, 509–511
See application file for complete search history.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP (57) ABSTRACT

A vehicle lighting apparatus is disclosed. The lighting apparatus comprises a vehicle console comprising a storage bin. An emissive portion comprising a luminescent material is disposed proximate the storage bin. A light guide is in optical communication with an exterior glass portion of the vehicle and configured to communicate environmental light to the emissive portion.

20 Claims, 5 Drawing Sheets

(56) References Cited

U.S. PATENT DOCUMENTS

| | | |
|---|---|---|
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

LUMINESCENT CONSOLE STORAGE BIN

FIELD OF THE INVENTION

The present invention generally relates to a lighting apparatus and more specifically relates to a lighting apparatus for a vehicle.

BACKGROUND OF THE INVENTION

Modern vehicles utilize various systems to improve convenience and ease of use. Vehicle storage trays and compartments are increasingly utilized to provide desirable features to consumers. The disclosure provides various embodiments of light devices that may be configured to illuminate vehicle consoles or storage bins as discussed herein.

SUMMARY OF THE INVENTION

According to one aspect of the present invention, a vehicle lighting apparatus is disclosed. The lighting apparatus comprises a vehicle console comprising a storage bin. An emissive portion comprising a luminescent material is disposed proximate the storage bin. A light guide is in optical communication with an exterior glass portion of the vehicle and configured to communicate environmental light to the emissive portion.

According to another aspect of the present invention, a vehicle lighting apparatus is disclosed. The lighting apparatus comprises a vehicle console comprising a storage bin and an active light source configured to emit a charging emission. An emissive portion comprising a luminescent material is disposed proximate the storage bin. Additionally, a light guide is in optical communication with an exterior glass portion and the active light source. The light guide is configured to communicate environmental light and the charging emission to the emissive portion.

According to yet another aspect of the present invention, a vehicle lighting apparatus is disclosed. The apparatus comprises a vehicle console comprising a storage bin and an active light source configured to emit a charging emission. An emissive portion comprising a luminescent material is disposed proximate the storage bin and configured to emit a luminescent emission. The lighting apparatus further comprises a light guide in optical communication with a windshield of the vehicle. The light guide is configured to communicate environmental light and the charging emission to the emissive portion to emit the luminescent emission.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized to clearly reference various elements of the disclosure.

Figure 1:
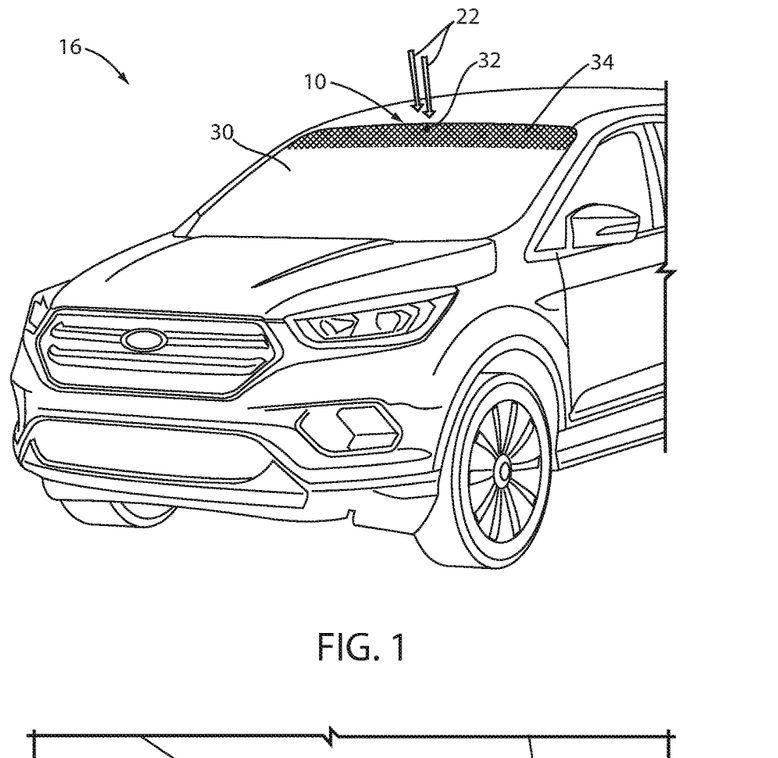
FIG. 1 is a perspective view of an exterior portion of a vehicle.
Figure 2:
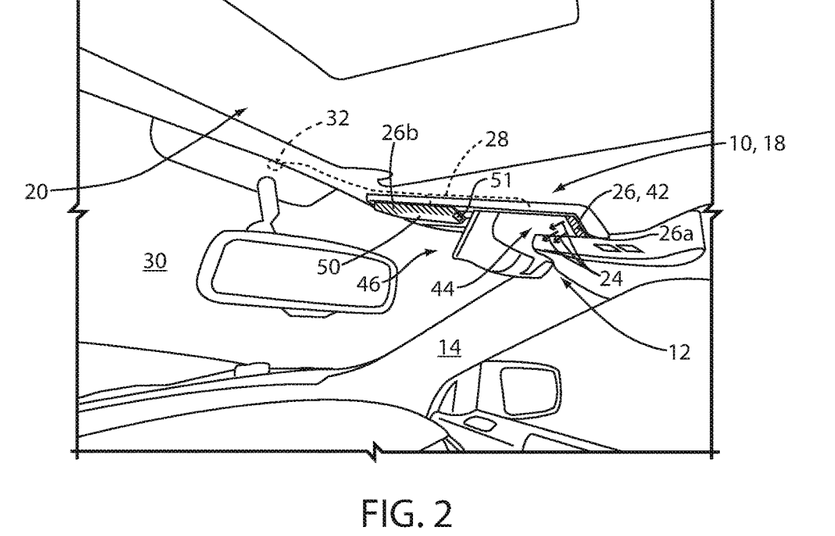
FIG. 2 is a perspective view of a passenger compartment of a vehicle demonstrating an overhead console comprising an illumination apparatus.

Referring to FIGS. 1 and 2, the following disclosure describes a lighting apparatus 10 configured to illuminate a storage bin 12. The storage bin may be located in a passenger compartment 14 of a vehicle 16 and may be disposed in an overhead console 18 proximate a headliner 20 of the vehicle 16. The lighting apparatus 10 may be configured to receive environmental light 22 and convert the environmental light 22 to at least one luminescent emission 24. In this way, the lighting apparatus 10 may be operable to illuminate one or more portions of the storage bin 12 and/or the overhead console 18 with the luminescent emission 24.

In some embodiments, lighting apparatus 10 may comprise one or more emissive portions 26 configured to emit the at least one luminescent emission 24. The emissive portions 26 may comprise one or more luminescent materials, which may be configured to retain a charge from the environmental light 22. The environmental light 22 may be received by a light guide 28 in optical communication with a windshield 30, sunroof, or any other suitable transmissive portion or window of the vehicle 16. In this configuration, the light guide 28 may receive light via an opening 32 formed in a tinted portion 34 of the windshield 30. The opening 32 may correspond to a transparent or light transmissive portion of the tinted portion 34 configured to transmit the environmental light 22 to the light guide 28. The transmission of the environmental light 22 via the light guide 28 is further discussed in reference to FIGS. 3, 4A, and 4B.

The environmental light 22 may be transmitted from the opening 32 to one or more of the emissive portions 26 via the light guide 28. In this configuration, the environmental light 22 may provide activation energy configured to charge the luminescent materials of the emissive portions 26. The luminescent materials may correspond to persistent luminescent materials configured to carry a charge and discharge light for a period of several minutes. For example, persistent luminescent materials as described herein may have an afterglow decay time longer than several minutes. Accordingly, the lighting apparatus 10 may be configured to receive a charge from the environmental light 22 and illuminate one or more of the emissive portions 26 for an extended period by discharging the stored energy from the environmental light 22.

Figure 3:
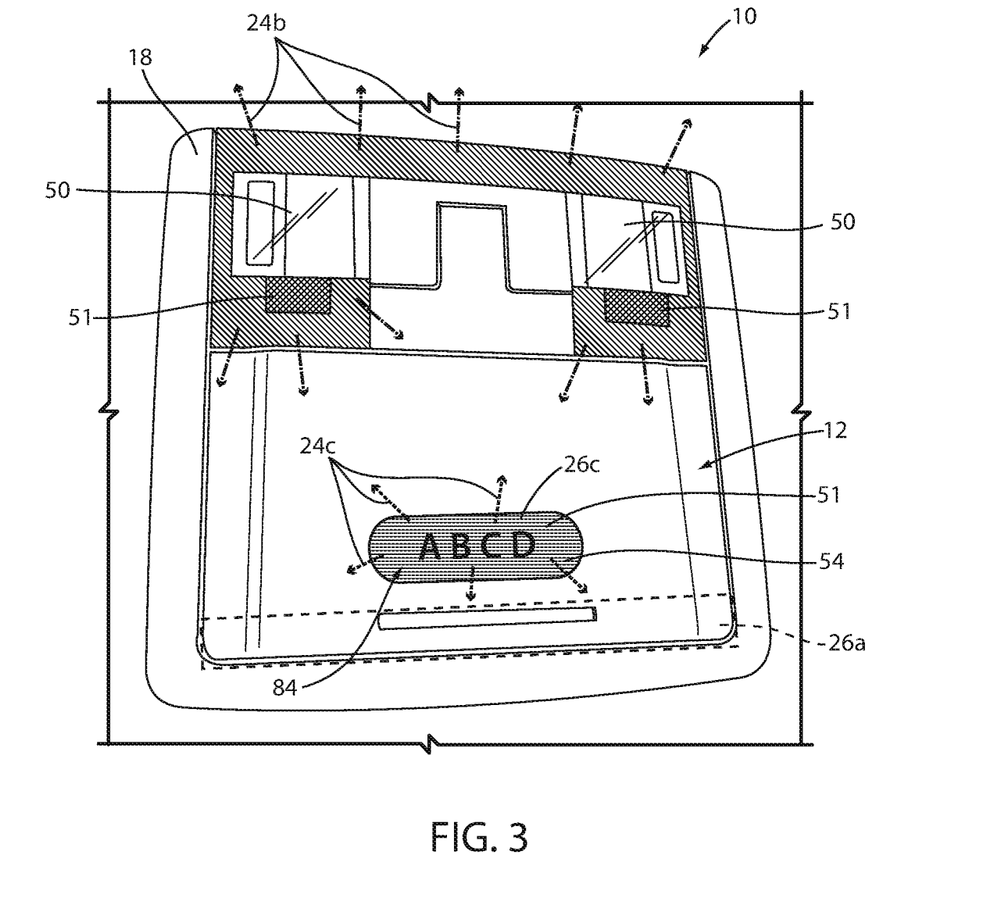
FIG. 3 is a bottom view of an overhead console demonstrating a storage bin.

Referring now to FIGS. 2 and 3, the overhead console 18 is demonstrated in a roof of the passenger compartment 14 of the vehicle 16. In the exemplary embodiment illustrated, a plurality of the emissive portions 26 are disposed on the overhead console 18 and the storage bin 12. For example, a first emissive portion 26a may be disposed in an interior surface 42 of a cavity 44 formed by the overhead console 18 and configured to retain the storage bin 12. In this configuration, a first emission 24a may be emitted from the first emissive portion 26 disposed on the interior surface 42. In this way, the first emission 24a may illuminate the storage bin 12 in a first color of light emitted from the first emissive portion 26 when the storage bin 12 is arranged in an open position 46.

A second emissive portion 26b may further be disposed proximate at least one utility light 50 disposed in the overhead console 18. The at least one utility light 50 may correspond to a map light or reading light that may be actuated by a passenger of the vehicle 16. Similar to the first emissive portion 26a, the second emissive portion 26b may be configured to receive the environmental light 22 via the light guide 28 to charge the luminescent material. The second emissive portion 26b may also comprise luminescent material disposed in light transmissive material forming a first light transmissive portion 54 configured to illuminate the second emissive portion 26b in a backlit configuration. Accordingly, the second emissive portion 26b may emit a second emission 24b in a second color in response to a charge receive via the environmental light 22. In this configuration, the second emissive portion 26b may illuminate a region proximate the at least one light source such that a passenger of the vehicle 16 may easily identify the location of a activation switch 51 or device configured to activate the utility light 50.

A third emissive portion 26c may be disposed on a surface of the storage bin 12. The third emissive portion 26c maybe at least partially light transmissive, such that the environmental light 22 may charge luminescent material dispersed in or disposed on an exterior surface 52 of a second light transmissive portion 55 of the storage bin 12. As later discussed in reference to FIG. 4A, the third emissive portion 26c may be configured to receive the environmental light 22 from the emitting optic when the storage bin 12 is configured in a closed position 56. In this configuration, the portion environmental light 22 may charge the luminescent material of the third emissive portion 26c. Accordingly, the third emission 24c may be emitted from the exterior surface 52 of the storage bin 12.

The utility light 50 may be in communication with a power source of the vehicle 16, and in some embodiments may be in communication with a controller or control circuit of the lighting apparatus 10. Accordingly, the utility light 50 may be activated by the controller in response to receiving an input from the activation switch 51 communicating an input. In this way, the second emissive portion 26b may illuminate the activation switch 51 such that the controller may selectively activate the utility light 50. The activation switch 51 may correspond to various forms of electrical or electro-mechanical switches. For example the activation switch 51 may correspond to a toggle switch, a bias switch, a rotary switch, etc.

Figure 4A:
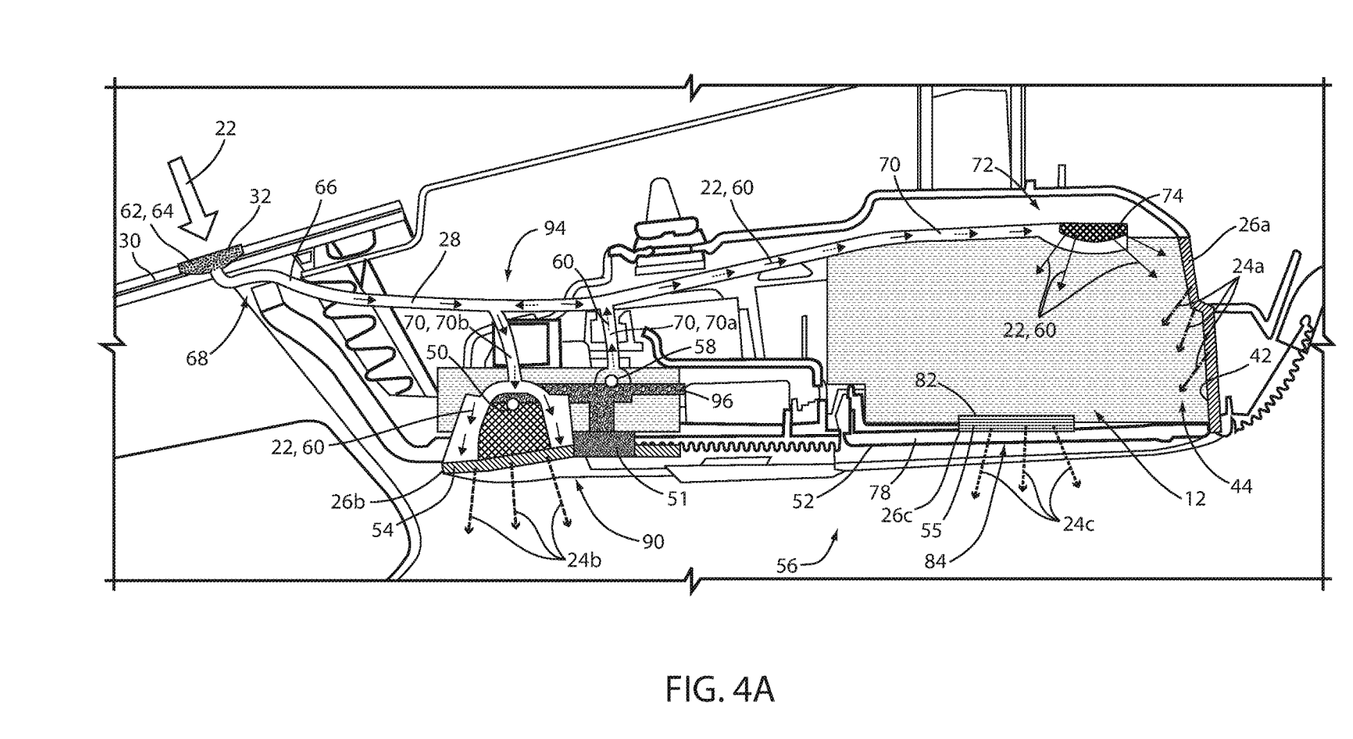
FIG. 4A is a cross-sectional view of the overhead console demonstrating a storage bin arranged in a closed configuration.
Figure 4B:
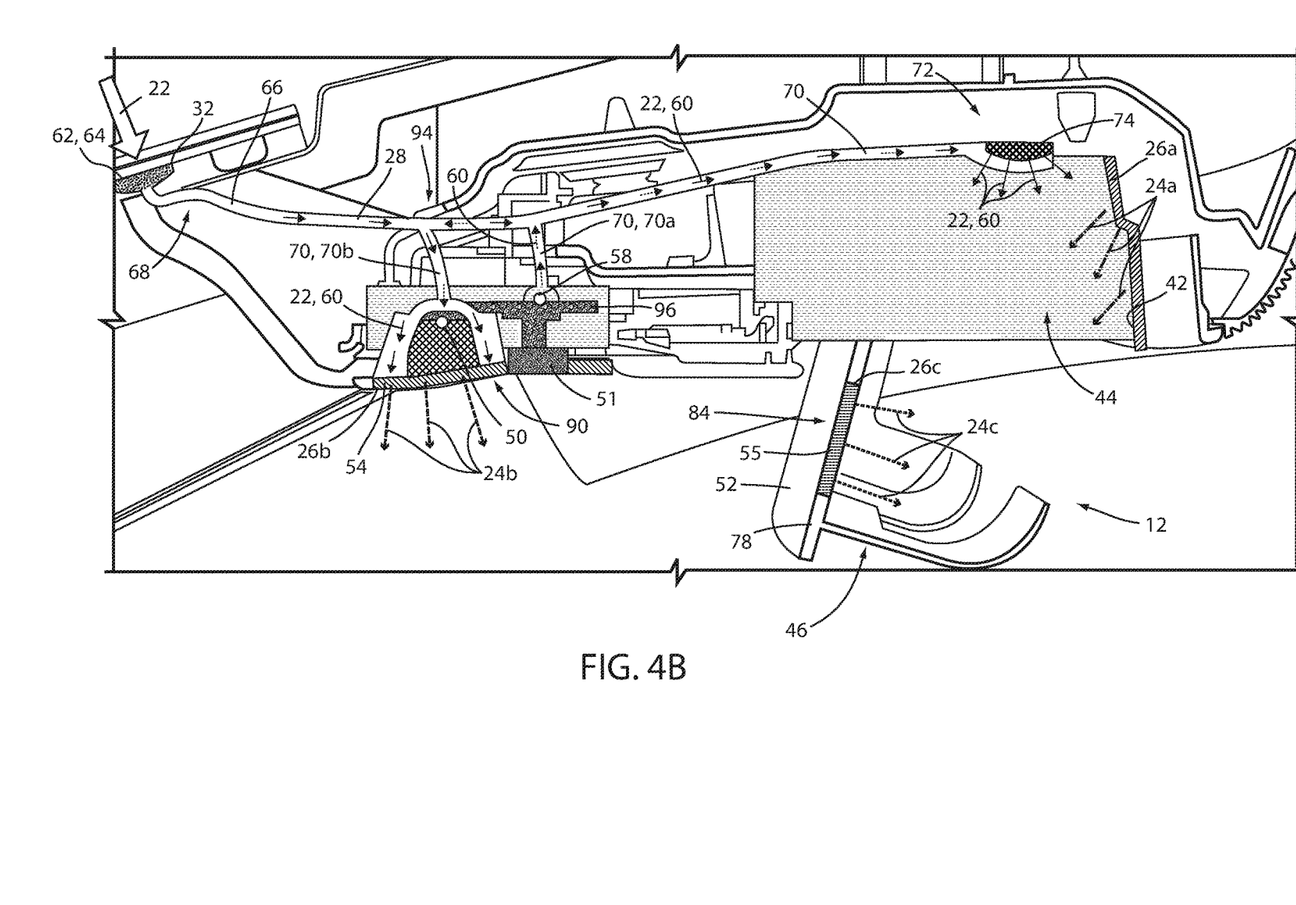
FIG. 4B is a cross-sectional view of the overhead console demonstrating a storage bin arranged in an open configuration.

Referring now to FIGS. 4A and 4B, cross-sectional views of an exemplary embodiment of the lighting apparatus 10 are shown in reference to the overhead console arranged in a closed position 56 and the open position 46, respectively. As discussed herein, the light guide 28 is shown in optical communication with the windshield 30 and configured to receive the environmental light via the opening 32 formed in the tinted portion 34. Additionally, in some embodiments, a light receiving optic 62 may be configured to receive light across a surface area 64 of the windshield 30 defined by the opening 32. In this configuration, the light receiving optic 62 may be configured to capture environmental light 22 impinging upon the surface area 64 of the opening 32 and focus the environmental light 22 from the surface are through a smaller cross-section of a body 66 of the light guide 28. In this way, a proximal end portion 68 of the light guide 28 may receive the environmental light 22 from the light receiving optic 62 and efficiently transmit the environmental light 22 to each of the emissive portions 26.

The environmental light 22 may be transmitted through the light guide 28 to each of the emissive portions 26. For example, the environmental light 22 may be transmitted to each of the first emissive portion 26a, the second emissive portion 26b, and the third emissive portion 26c. The emissive portions 26a, 26b, and 26c may be configured to output the first emission 24a, the second emission 24b, and a third emission 24c. The light guide 28 may be configured to deliver a portion of the environmental light 22 to each of the emissive portions 26 via a plurality of light transmitting portions 70. In this configuration, the environmental light 22 received by the light receiving optic 62 may be divided and communicated to each of the emissive portions 26 via the transmissive portions 70.

A first light transmitting portion 70a may correspond to a distal end portion 72 of the light guide 28 relative to the light receiving optic 62. The distal end portion 72 may be configured to terminate into an emitting optic 74. The emitting optic 74 may be configured emit a first portion of the environmental light 22 to the first emissive portion 26a and the third emissive portion 26c. As previously discussed, the first emissive portion 26a may be disposed in an interior surface 42 of a cavity 44 formed by the overhead console 18. In this configuration, the first emission 24a may be emitted from the first emissive portion 26 disposed on the interior surface 42. The first emission 24a may illuminate the storage bin 12 in a first color of light emitted from first emissive portion 26 when the storage bin 12 arranged in an open position 46.

The third emissive portion 26c may correspond to the second light transmissive portion 55 of a perimeter wall 78 of the storage bin 12. The at least partially transmissive portion 54 may comprise the third emissive portion 26c applied to the exterior surface 52 and/or dispersed in a material forming the second light transmissive portion 55. Accordingly, as demonstrated in FIG. 4A, the third emissive portion 26c may be configured to receive the environmental light 22 from the emitting optic 74 when the storage bin is configured in the closed position 56. In this configuration, the first portion environmental light 22 may charge the luminescent material of the third emissive portion 26c. Accordingly, the third emission 24c may be emitted from the exterior surface 52 and an interior surface 82 of the storage bin 12.

The third emissive portion 26c may correspond to a graphic, logo, emblem, or various decorative elements that may be illuminated all or in part by the third emission 24c. For example, the third emissive portion may correspond to a manufacturer logo or emblem 84 disposed on and/or formed from a material of the second light transmissive portion 55. Accordingly, the third emission 24c may illuminate the emblem 84 to enhance the appearance of the emblem 84. Though discussed in reference to specific numeric designations, each of the emissions, emissive portions, and various other numbered elements (e.g. first, second, etc.) discussed herein are not limited to the particular designation referred to in the exemplary embodiment. Accordingly, the lighting apparatus 10 may comprise various combinations of elements without departing from the spirit of the disclosure.

The second emissive portion 26b may be disposed proximate the utility lights 50. For example, the second emissive portion 26b may form a portion of an exterior panel 90 of the overhead console 18. In this configuration, the second emissive portion 26b may correspond to the second light transmissive portion 54 having the luminescent material dispersed therein and/or disposed thereon. The second emissive portion 26b may receive a second portion of the environmental light 22 via a second light transmitting portion 70b in optical communication with an intermediate portion 94 of the light guide 28. In this way, the second emissive portion 26b may emit the second emission 24b from the exterior panel 90 to illuminate or accent the utility lights 50. The second emission 24b may accent the utility lights 50 such that a passenger of the vehicle 16 may identify a location of an activation switch of the utility lights 50.

As discussed herein, the emissive portions 26 may be supplied charging energy from the environmental light 22 transmitted via the light guide 28. Additionally, in some embodiments, the emissive portions 26 may further be configured to receive light energy from the active light source 58 in optical communication with the light guide 28. In this configuration, a control circuit 96 of the lighting apparatus 10 may be configured to activate the active light source 58 to activate an excitation or charging emission 60 configured to charge the luminescent materials disposed in the emissive portions 26. In this way, the lighting apparatus 10 may be configured to utilize the environmental light 22 to charge the emissive portions 26 with minimal energy usage from a power source of the vehicle 16. Further details of an exemplary embodiment of a controller of the lighting apparatus 10 are discussed in reference to FIG. 5.

The active light source 58 may correspond to one or more light sources configured to emit the charging emission 60. The active light source 58 may correspond to various forms of light sources that may be driven by electrical current or control signals (e.g. halogen lights, fluorescent lights, light emitting diodes (LEDs), etc.). The charging emission 60 may correspond to one or more wavelengths of light at a first wavelength, which may correspond to an activation emission or charging emission configured to charge the luminescent materials of the emissive portions 58. The controller of the lighting apparatus 10 may selectively activate the active light source 26 to emit the charging emission 60 to charge the emissive portions in response to a timing or availability of environmental light impinging upon the light receiving optic 62.

The luminescent materials forming the emissive portions 26 may correspond to transient or persistent luminescent materials. The luminescent material(s) may be applied as a coating and/or dispersed in a material forming the surface or a carrier layer of the emissive portions 26. In an exemplary embodiment, one or more of the emissive portions 26 may be formed by a persistent luminescent material configured to charge in response to receiving the environmental light 22 or the charging emission 60. Additionally, one or more of the emissive portions 26 may be formed of transient luminescent materials configured to convert the environmental light 22 and/or the charging emission 60 but not to hold a substantial charge. That is, transient luminescent materials may only emit light for a short duration after receiving the environmental light 22 and/or the charging emission 60. A short duration as may correspond to a period of time less than 5 minutes and may correspond to times less than 1 minute, 30 seconds, 10 seconds or less depending on the particular properties of the transient luminescent materials.

As utilized herein, both transient luminescence and persistent luminescence may correspond to light emitted from a luminescent portion. Persistent luminescence may be distinguished from transient luminescence as described herein due to a continued emission of light or luminescence being emitted from a persistent luminescent material of the emissive portions 26. For example, one or more of the emissive portions 26 may comprise persistent luminescent materials. For example, the first emissive portion 26a may be configured to emit the first emission 24a for a significant period of time following the deactivation of the charging emission 60 or an inactivity of the environmental light 22. A significant period of time may correspond to a duration exceeding approximately 5 minutes, but may correspond to a period of time up to or exceeding 60 minutes.

In some embodiments, one or more of the emissions 24 may correspond to light emitted from the emissive portions 26 at one or more of wavelengths. The wavelength(s) of each of the emissions may correspond to significantly different spectral color ranges. In this way, each of the emissions 26a, 26b, and 26c may be configured to emit light in the first color, the second color, and the third color, respectively. The plurality of wavelengths may be generated by a red-emitting luminescent material having a wavelength of approximately 620-750 nm, a green emitting luminescent material having a wavelength of approximately 526-606 nm, and a blue or blue green emitting luminescent material having a wavelength of approximately 400-525 nm.

The persistent luminescent materials as discussed herein may correspond to phosphorescent materials. Persistent luminescent materials may correspond to alkaline earth aluminates and silicates, for example doped (di)silicates. Such substances may incorporate persistent luminescent phosphors or other doped compounds. Persistent luminescent substances may be doped with one or more ions, which may correspond to rare earth elements, for example: $Eu^{2+}$, $Tb^{3+}$, $Dy^{3+}$, and $R^{3+}$. Persistent luminescent materials may be defined as being operable to carry a charge and discharge light for a period of several minutes. For example, persistent luminescent materials as described herein may have an afterglow decay time longer than several minutes. The decay time may be defined as the time between the end of the excitation and the moment when the light intensity of the luminescent material drops below a minimum visibility of 0.32 mcd/m$^2$. The minimum visibility is roughly 100 times the sensitivity of the dark-adapted human eye, which corresponds to a definition used in the safety signage and by various researchers of luminescent properties.

A persistent luminescent material as discussed herein may be operable to emit light at an intensity of 0.32 mcd/m$^2$ after a decay time of 10 minutes. In an exemplary embodiment, a persistent luminescent material may be operable to emit light at an intensity of 0.32 mcd/m$^2$ after a decay time of 30 minutes and in some embodiments for a period longer than 60 minutes. In an exemplary embodiment, a persistent luminescent material may have a luminance ratio of greater than or equal to 20% of a first intensity after 10 minutes of decay time relative to a second intensity after 30 minutes of decay time. Additionally, in some embodiments, a persistent luminescent material may have a luminance ratio of greater than or equal to 10% of a first intensity after 10 minutes of decay time relative to a second intensity after 60 minutes of decay time.

As discussed herein, persistent luminescent materials may be operable to store energy received from the charging emission 60 or a corresponding wavelength of light from the environmental light 22. The stored energy may then be emitted from the persistent luminescent material for a wide range of times, some extending up to approximately 24 hours. Such materials, when utilized in the emissive portions 26 discussed herein make it possible to sustain light from the emissive portions 26 by periodically emitting the charging emissions 60 from the active light source 58. The periodic emission of the charging emissions 60 may provide for a substantially sustained charge of the persistent luminescent materials to provide for a consistent ambient illumination of the emissive portions 26.

The transient luminescent materials discussed herein may correspond to organic or inorganic fluorescent dyes configured to convert the charging emission 60 to output emissions. For example, the transient luminescent materials may comprise a luminescent structure of rylenes, xanthenes, porphyrins, phthalocyanines, or other materials suited to a particular Stokes shift defined by an absorption range and an emission fluorescence. In some embodiments, the transient luminescent materials may be of at least one inorganic luminescent material selected from the group of phosphors. The inorganic luminescent material may more particularly be from the group of Ce-doped garnets, such as YAG:Ce. As such, each of the emissive portions 26 may be selectively activated by a wide range of wavelengths received from the charging emission 60 configured to excite one or more luminescent materials to emit an output emission having a desired color.

Each of the luminescent materials of the emissive portions 26 may comprise one or more transient luminescent and/or persistent luminescent materials. The luminescent materials may be utilized in the lighting apparatus 10 in various configurations. Additional information regarding the construction of luminescent structures to be utilized in at least one luminescent portion is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

The light guide 28 may correspond to a light diffusing fiber, for example a glass or polymeric optical fiber. The optical fiber may be substantially transparent and configured to bend or flex to conform to various shapes or profiles of the overhead console 18 of the vehicle 16. The optical fiber may be configured to transmit the environmental light 22 and/or the charging emission 60 through the body 66 of the light guide 28. In this configuration, the environmental light 22 and/or the charging emission 60 may be communicated along the light guide to supply charge or activate the emissive portions 26. In this way, the lighting apparatus 10 may be configured to output the emissions 24 from the emissive portions 26 in response to the environmental light 22 or the charging emission 60 being communicated to the emissive portions 26.

Figure 5:
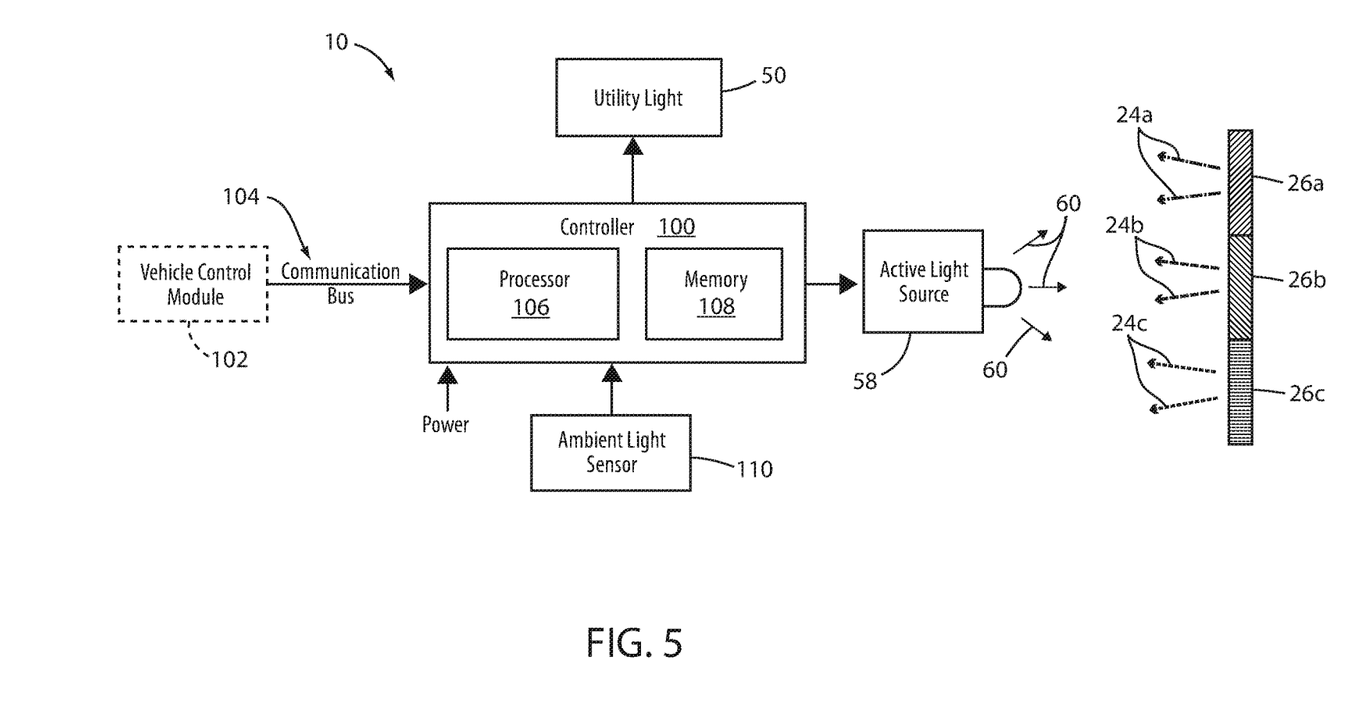
FIG. 5 is a block diagram of a controller configured to control an illumination apparatus in accordance with the disclosure.

Referring to FIG. 5, a block diagram of a controller 100 configured to control the lighting apparatus 10 is shown. The controller 100 may be in communication with a vehicle control module 102 via a communication bus 104 of the vehicle 16. The communication bus 104 may be configured to deliver signals to the controller 100 identifying various states of the vehicle 16. For example, the communication bus 104 may be configured to communicate an operating condition of the vehicle 16 (e.g. the ignition is active), an ambient light level, a seat occupancy, a door ajar signal, a gear selection, a fuel level indication, a door lock/unlock event or any other information or control signals that may be communicated via the communication bus 104. In this way, the controller 100 may selectively activate the active light source 58 in response to one or more conditions communicated by the vehicle control module 102.

The controller 100 may include a processor 106 comprising one or more circuits configured to receive the signals from the communication bus 104 and output signals to control the light source 58 discussed herein. The processor 106 may be in communication with a memory 108 configured to store instructions to control the activation of the active light source 58. The processor 106 may receive various signals and/or messages corresponding to vehicle conditions via the communication bus 104. In this way, the controller 100 may be configured to receive various indications corresponding to vehicle states that may trigger an activation of the light source 58.

The controller 100 may further be in communication with an ambient light sensor 110. The ambient light sensor 110 may be configured to communicate signals to the controller 100 such that the controller 100 may identify the ambient light level proximate the vehicle 16. The ambient light sensor 110 may correspond to various forms of sensors, for example charge coupled devices CCDs, photodiodes, etc. Based on the input from the ambient light sensor 110, the controller 100 may selectively activate the light source 58 to charge the emissive portions 26 based on the available ambient or environmental light 22 as well as various states of the vehicle 16.

The ambient light sensor 110 may be operable to communicate a light condition, for example a level brightness or intensity of the ambient light proximate the vehicle 16. In response to the level of the ambient light, the controller 100 may be configured to adjust activate the active light source 58 to emit the charging emission 60. In this way, the controller 100 may charge each of the emissive portions 26 and control an intensity of the emissions 24 by controlling a duty cycle, current, or voltage supplied to the active light source 58. In this way, the controller 100 may control a level of charge of the luminescent materials corresponding to the emissive portions 26 to control an intensity of the emissions 24. Such a control may be particularly effective during times where the environmental light 22 is limited, such as at night or dark ambient lighting conditions.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting apparatus comprising:
    a vehicle console comprising a storage bin;
    a first emissive portion comprising a luminescent material disposed proximate the storage bin; and
    a light guide in optical communication with an exterior glass portion and configured to communicate environmental light from outside the vehicle to the emissive portion.

2. The lighting apparatus according to claim 1, wherein the luminescent material is configured to emit a luminescent emission in response to receiving the environmental light.

3. The lighting apparatus according to claim 1, wherein the luminescent material corresponds to persistent luminescent material configured to emit the luminescent emission over a decay time exceeding ten minutes.

4. The lighting apparatus according to claim 1, wherein the vehicle console corresponds to an overhead console disposed in a roof of a vehicle.

5. The lighting apparatus according to claim 1, wherein the glass portion corresponds to a windshield of the vehicle.

6. The lighting apparatus according to claim 1, further comprising a second emissive portion in communication with the light guide.

7. The lighting apparatus according to claim 1, wherein the vehicle console further comprises a utility light configured to generate light to illuminate a portion of a passenger compartment.

8. The lighting apparatus according to claim 1, wherein the second emissive portion corresponds to an accent light disposed proximate the utility light.

9. A vehicle lighting apparatus comprising:
    a vehicle console comprising a storage bin;
    an active light source configured to emit a charging emission;
    an emissive portion comprising a luminescent material disposed proximate the storage bin; and
    a light guide in optical communication with an exterior glass portion and the active light source, wherein the light guide is configured to communicate environmental light from outside the vehicle and the charging emission to the emissive portion.

10. The lighting apparatus according to claim 9, wherein the luminescent material is configured to emit a luminescent emission in response to receiving at least one of the environmental light and the charging emission.

11. The lighting apparatus according to claim 9, wherein the luminescent material corresponds to persistent luminescent material configured to emit the luminescent emission over a decay time exceeding ten minutes.

12. The lighting apparatus according to claim 9, wherein the vehicle console corresponds to an overhead console disposed in a roof of a vehicle.

13. The lighting apparatus according to claim 9, wherein the glass portion corresponds to a windshield of the vehicle.

14. The lighting apparatus according to claim 9, further comprising a controller, the controller configured to selectively activate the active light source to supply the charging emission to the emissive portion.

15. The lighting apparatus according to claim 9, further comprising a light sensor configured to detect the environmental light.

16. The lighting apparatus according to claim 9, wherein the controller is configured to selectively activate the active light source to emit the charging emission in response to a lapse in the environmental light identified by the light sensor.

17. The lighting apparatus according to claim 9, wherein the lapse in the environmental light is identified by the controller for a predetermined period of time.

18. A vehicle lighting apparatus comprising:
    a vehicle console comprising a storage bin;
    an active light source configured to emit a charging emission;
    an emissive portion comprising a luminescent material disposed proximate the storage bin and configured to emit a luminescent emission; and
    a light guide in optical communication with a windshield, wherein the light guide is configured to communicate environmental light from outside the vehicle and the charging emission to the emissive portion to emit the luminescent emission.

19. The lighting apparatus according to claim 18, further comprising a controller, the controller configured to selectively activate the active light source to supply the charging emission to the emissive portion.

20. The lighting apparatus according to claim 19, wherein the controller is configured to selectively activate the active light source to emit the charging emission in response to a lapse in the environmental light identified by the light sensor.

* * * * *

UNITED STATES PATENT AND TRADEMARK OFFICE
CERTIFICATE OF CORRECTION

PATENT NO. : 9,573,520 B1  
APPLICATION NO. : 15/232082  
DATED : February 21, 2017  
INVENTOR(S) : Salter et al.

Page 1 of 1

It is certified that error appears in the above-identified patent and that said Letters Patent is hereby corrected as shown below:

In the Claims

Column 9, Claim 1, Line 27:
Before "emissive portion" insert --first--.

Column 9, Claim 8, Line 48:
"claim 1" should be --claim 6--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*